(12) United States Patent
Harras et al.

(10) Patent No.: US 9,800,946 B2
(45) Date of Patent: Oct. 24, 2017

(54) DYNAMIC REAL-TIME TV WHITE SPACE AWARENESS

(71) Applicant: Carnegie Mellon University, Pittsburgh, PA (US)

(72) Inventors: Khaled A. Harras, Pittsburgh, PA (US); Moustafa Amin Youssef, Alexandria (EG); Mohamed Abdelrahman Ahmed Ibrahim, Alexandria (EG); Ahmed Mohamed Said Issa, Alexandria (EG)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 14/760,248

(22) PCT Filed: Feb. 14, 2014

(86) PCT No.: PCT/US2014/016367
§ 371 (c)(1),
(2) Date: Jul. 10, 2015

(87) PCT Pub. No.: WO2014/127189
PCT Pub. Date: Aug. 21, 2014

(65) Prior Publication Data
US 2015/0365733 A1 Dec. 17, 2015

Related U.S. Application Data

(60) Provisional application No. 61/850,410, filed on Feb. 14, 2013.

(51) Int. Cl.
*H04N 21/647* (2011.01)
*H04N 21/258* (2011.01)
(Continued)

(52) U.S. Cl.
CPC ...... *H04N 21/64738* (2013.01); *H04H 60/41* (2013.01); *H04L 67/12* (2013.01);
(Continued)

(58) Field of Classification Search
CPC ....... H04N 21/64738; H04N 21/25891; H04N 21/4223; H04N 21/44218;
(Continued)

(56) References Cited

U.S. PATENT DOCUMENTS

2007/0061830 A1* 3/2007 Chang .................... H04N 7/163
725/9
2009/0260027 A1* 10/2009 Weinblatt ............... H04H 60/37
725/20

(Continued)

FOREIGN PATENT DOCUMENTS

WO 2012003566 A1 7/2010

*Primary Examiner* — Pinkal R Chokshi

(57) ABSTRACT

This invention describes a cloud-based architecture that orchestrates the detection and dissemination of highly-dynamic, real-time, and fine-grained TV white space information to improve spectrum information used for White Space Devices (WSDs). Wasted spectrum opportunities were first identified, both temporal and spatial, due to the current approach of white spaces detection. This invention introduces a next generation of geo-location databases capable of tracking the state of the relatively static TV transmitters and the highly dynamic TV receivers. A quantitative evaluation of the potential gain in white space availability for large scale deployments of this novel architecture demonstrated significant improvement in the availability of white spaces.

16 Claims, 3 Drawing Sheets

(51) Int. Cl.
  *H04N 21/4223* (2011.01)
  *H04N 21/442* (2011.01)
  *H04N 21/61* (2011.01)
  *H04N 21/658* (2011.01)
  *H04W 16/14* (2009.01)
  *H04H 60/41* (2008.01)
  *H04L 29/08* (2006.01)

(52) U.S. Cl.
  CPC ... *H04N 21/25891* (2013.01); *H04N 21/4223* (2013.01); *H04N 21/44218* (2013.01); *H04N 21/44222* (2013.01); *H04N 21/6112* (2013.01); *H04N 21/6582* (2013.01); *H04W 16/14* (2013.01)

(58) Field of Classification Search
  CPC ......... H04N 21/44222; H04N 21/6112; H04N 21/6582; H04H 60/41; H04W 16/14
  See application file for complete search history.

(56) References Cited

U.S. PATENT DOCUMENTS

| | | | |
|---|---|---|---|
| 2011/0039522 A1* | 2/2011 | Partridge | G01S 19/45 455/414.1 |
| 2012/0108179 A1 | 5/2012 | Kasslin et al. | |
| 2013/0003591 A1* | 1/2013 | Novak | H04W 36/06 370/252 |
| 2013/0103684 A1* | 4/2013 | Yee | H04W 16/14 707/736 |

\* cited by examiner

DYNAMIC REAL-TIME TV WHITE SPACE AWARENESS

RELATED APPLICATIONS

This application claims the benefit of U.S. Provisional Application No. 61/850,410, filed Feb. 14, 2013, the disclosure of which is incorporated herein by reference.

BACKGROUND OF THE INVENTION

The unlicensed usage of TV white spaces has been introduced by the Federal Communications Commission (FCC) as a means to supply bandwidth for the ever increasing demand for high quality communication and multimedia streaming using mobile devices. Utilizing "white spaces", which refer to portions of the UHF spectrum (and parts of the VHF spectrum in the US), is only allowed while strictly forbidding interference with spectrum incumbents (i.e. TV receivers and wireless microphones). The ruling ensures the mitigation of interference between spectrum incumbents and White Space Devices (WSDs—devices intended to use the available bandwidth) through forcing WSDs to use one of two methods.

Following the first method, WSDs use white spaces after sensing the spectrum for TV transmissions with a very low threshold of −107 dbm. Spectrum sensing capabilities adds complexity and cost complications to WSDs so as to be able to detect this low threshold. The second method relies on consulting geo-location databases that keep track of available white spaces in certain areas. The main spectrum incumbents that need protection are TV receivers, not transmitters. TV receivers are typically passive, i.e. they do not transmit signals, and thus are difficult to detect. Therefore, geo-location databases protect TV receivers by protecting the entire coverage area of a TV transmitter. This is accomplished by keeping a record of information regarding TV transmitters, including location, antenna height, transmission power, and channels used. Geo-location databases combine this information with sophisticated propagation models to determine the protected area for a TV transmitter, where no WSD can be active.

It can be argued that current geo-location database regulations, while guaranteeing high protection of the spectrum incumbents, waste significant spectrum opportunities by protecting the entire coverage area of TV transmitters. In particular, it is not necessary true that the entire coverage area contains active TV receivers. In many cases, there are spectrum holes, both temporal and spatial, that are void of active TV receivers. These spectrum holes are wasted opportunities that can reach up to 23 channels in some urban areas (e.g. New York County, N.Y. and Miami City, Fla.) according to results presented herein. This gain is a great incentive for exploiting the potential for leveraging dynamic real-time TV white space awareness, especially in spectrum-hungry urban areas that will experience exponential demand for wireless bandwidth.

FIG. 1 summarizes the different scenarios in which white space opportunities are missed. In Scenario 1 is a temporally wasted opportunity. Although the white space network lies within the TV station's protected service area, the TV set in the vicinity of the network is turned OFF (or for the same practical purpose, currently running one channel leaving other channels available for unlicensed usage). Conventional geo-location databases that are not aware of the location of TV sets or their state, will declare the entire set of allocated channels in the area as unavailable.

The second Scenario is composed of two different instances (2.a and 2.b) in which white spaces are spatially wasted. In Scenario 2.a, the white space network lies within the protected service area but has no TV sets in the vicinity of the network. In Scenario 2.b, the white space network lies in the theoretical protected service area of the TV station, but the station's signal is obstructed. These scenarios lead to wasted white space opportunities, because conventional geo-location databases rely solely on propagation models.

Avoiding wasting spectrum opportunities is particularly important in urban areas, where huge numbers of wireless devices and congested RF spectrum are the norm. Table 1 shows the available white spaces for both fixed and portable WSDs in four urban and four rural cities. We observe that white spaces are more available for portable WSDs compared to fixed WSDs as the maximum allowable transmission power is 4 W for fixed WSDs and 40 mW for portable WSDs.

TABLE 1

Urban and rural areas channel availability.

| City | Available Channels for Fixed WSD (4W) | Available Channels for Portable 100 mW WSD | Available Channels for Portable 40 mW WSD |
|---|---|---|---|
| Urban Areas | | | |
| Los Angeles, CA | 0 | 0 | 0 |
| New York, NY | 0 | 0 | 1 |
| Miami, FL | 0 | 0 | 2 |
| Philadelphia, PA | 1 | 0 | 3 |
| Rural Areas | | | |
| Hudson, NY | 13 | 7 | 18 |
| Palatka, FL | 15 | 11 | 20 |
| Amador City, CA | 18 | 10 | 20 |
| Conconully, WA | 23 | 16 | 25 |

Temporal spectrum opportunity waste occurs when the state of the TV set (ON/OFF or the channel it is currently tuned to) is ignored. However, spatial spectrum opportunity waste occurs when an area with no TV sets, or outside the coverage area of a TV tower, is falsely protected, to overprotect TV receivers. These wasted opportunities are critical, especially in spectrum-hungry urban areas. From a different perspective, WSDs with spectrum sensing capabilities could partially avoid wasting spectrum. However, sensing capabilities are no longer a requirement, and equipping all WSDs with these capabilities will incur cost and power consumption issues.

Based on the aforementioned observations on current geo-location databases, a new cloud-based architecture for future dynamic real-time TV white space awareness that takes into account both TV transmitters and TV receivers is described. This invention builds on collaborative spectrum sensing approaches, focusing on maintaining accuracy on a city-wide scale. In particular, there is an argument for a crowd-sourcing approach, where hybrid devices collaborate to detect the state of TV receivers (e.g. location, ON/OFF, and TV station viewed) in their general area and the coverage of TV transmitters areas in real-time. Recent studies show that, while average Americans watch 5.2 hours of TV a day, less than 10% of these TV viewers watch broadcast channels. This information highlights the dynamic nature of spectrum opportunities that are constantly changing with each flip of a channel. Finally, it's possible to make use of the scalability and vast computational and storage capabilities of the cloud to keep track of these highly-dynamic, real-time and fine-grained TV white spaces.

SUMMARY OF THE INVENTION

The present invention describes a method and deployable architecture to detect white space opportunities. This new architecture extends traditional geo-location databases along two dimensions: 1) it achieves real-time view of the coverage area of TV towers through spectrum sensory information that was obtained from sensing enabled WSDs, and 2) it collects the locations and states (i.e. ON/OFF and channel viewed) of TV receivers by leveraging ubiquitously available sensors, (e.g. standard cell phone sensors, such as microphones and cameras or sensors embedded in smart phones). The method presents a novel and unconventional approach to spectrum sensing in which both the presence and the state of the receivers are tracked using ambient sensors. Moreover, it can provide information about the stochastic behavior of the TV viewers, in terms of their preferences for channel viewing (e.g. preferred channels, time of day of watching TV, and average period of viewing). A quantitative evaluation of the potential gain in white space availability for large scale deployments of this invention demonstrated significant improvement in the availability of white spaces.

DETAILED DESCRIPTION OF THE INVENTION

The identified wasted spectrum opportunities requires alterations in conventional geo-location databases to evolve from storing and processing the relatively static information regarding TV transmitters (e.g. location, transmission power, antenna height and channel), to collect, process and store the highly dynamic, real-time information regarding TV receivers reported by equipped WSDs. To address this evolution, the scalability and reliability of cloud storage and processing is exploited. A new architecture is presented to generate real-time, dynamic geo-location databases via a cloud-based system that is responsible for processing and aggregating sensory information on TV receivers. This information is different in: 1) nature (e.g. spectrum and ambient sensory information); and 2) reliability metrics (e.g. credibility of certified geo-location databases compared to contributing sensors). This architecture aims to address the expected bandwidth demand on white space networks by tracking every available spectrum opportunity in real-time.

System Architecture

Overview and Operation.

Figure 1:
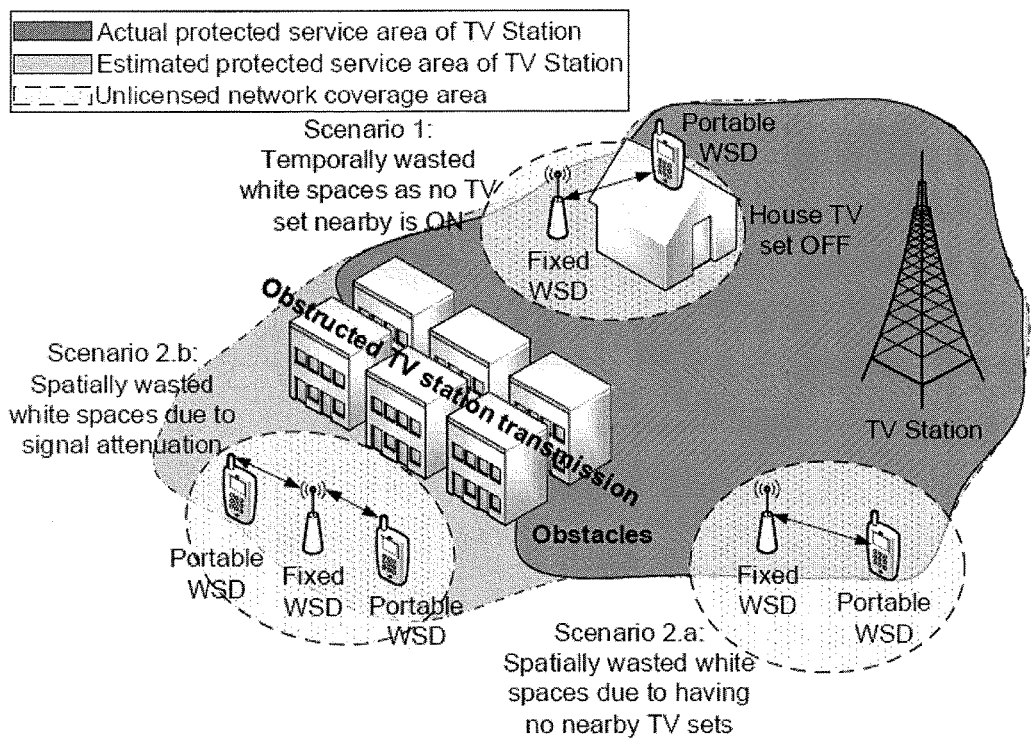
FIG. 1 summarizes three different scenarios in which white spaces opportunities were lost.
Figure 2:
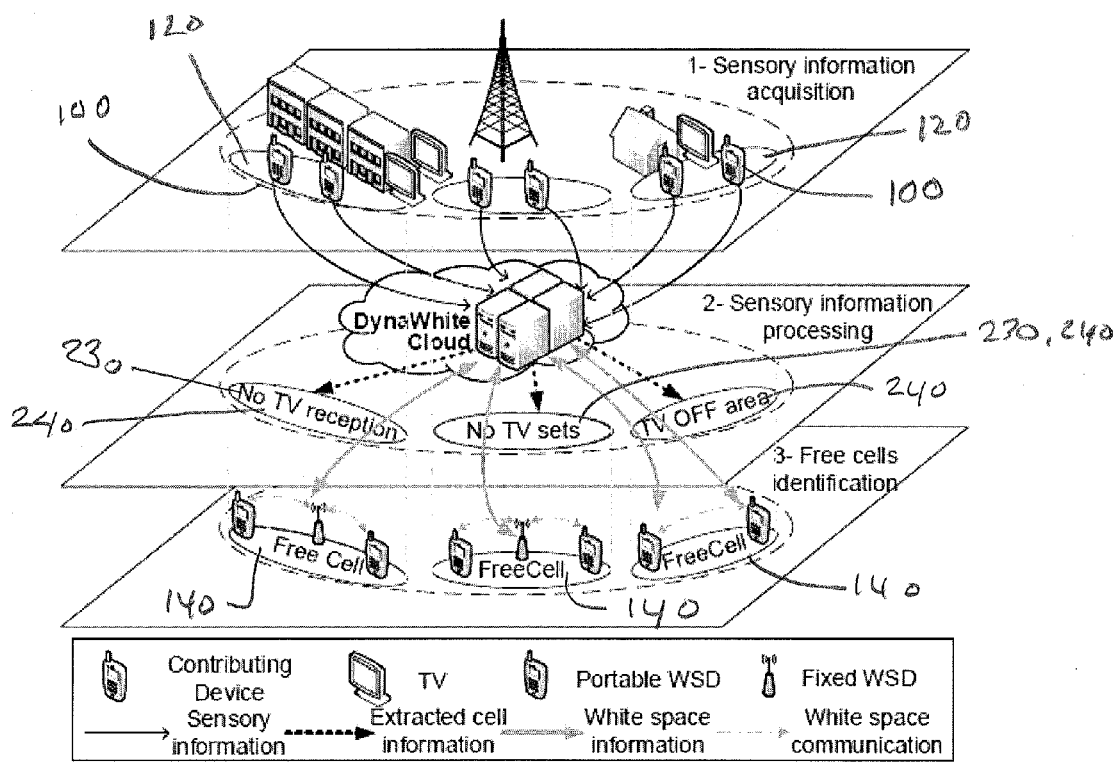
FIG. 2 illustrates an overview of the system's operation scenario.

FIG. 2 gives an overview of the invention. Contributing devices 100, equipped with localization mechanisms, submit location tagged spectrum sensing data (from WSDs) or ambient sensing data (from standard cell phones and embedded sensors) to the cloud infrastructure of the system. The system divides the map into fine grained cells 120 and calculates white space availability for each cell separately based on the collected sensory information. Cells may be of any desirable size, ranging from 1 $cm^2$ to a single room to an entire district. In practice, cell size is dependent on several factors, including, for example, system complexity and density of devices. It is also possible to have a hierarchy of cells, where a large cell can be composed of smaller cells.

A cell is considered a "free cell" 140 with respect to a certain channel in two cases. The first case occurs when there is no TV reception of the channel within the cell (i.e., no TV signal within the particular cell or all TV sets in the cell turned off). The second case occurs when the cell has no TV sets that are tuned to the channel (i.e., TV set may be tuned to different channels). The system supports both push and pull modes for obtaining sensory information. The two modes enable the system to enhance its view of the spectrum, through either continuous pushes or on demand pulls from available contributors. It should be noted that the system will default to traditional geo-location databases when there is no sensory information available for a particular cell.

Figure 3:
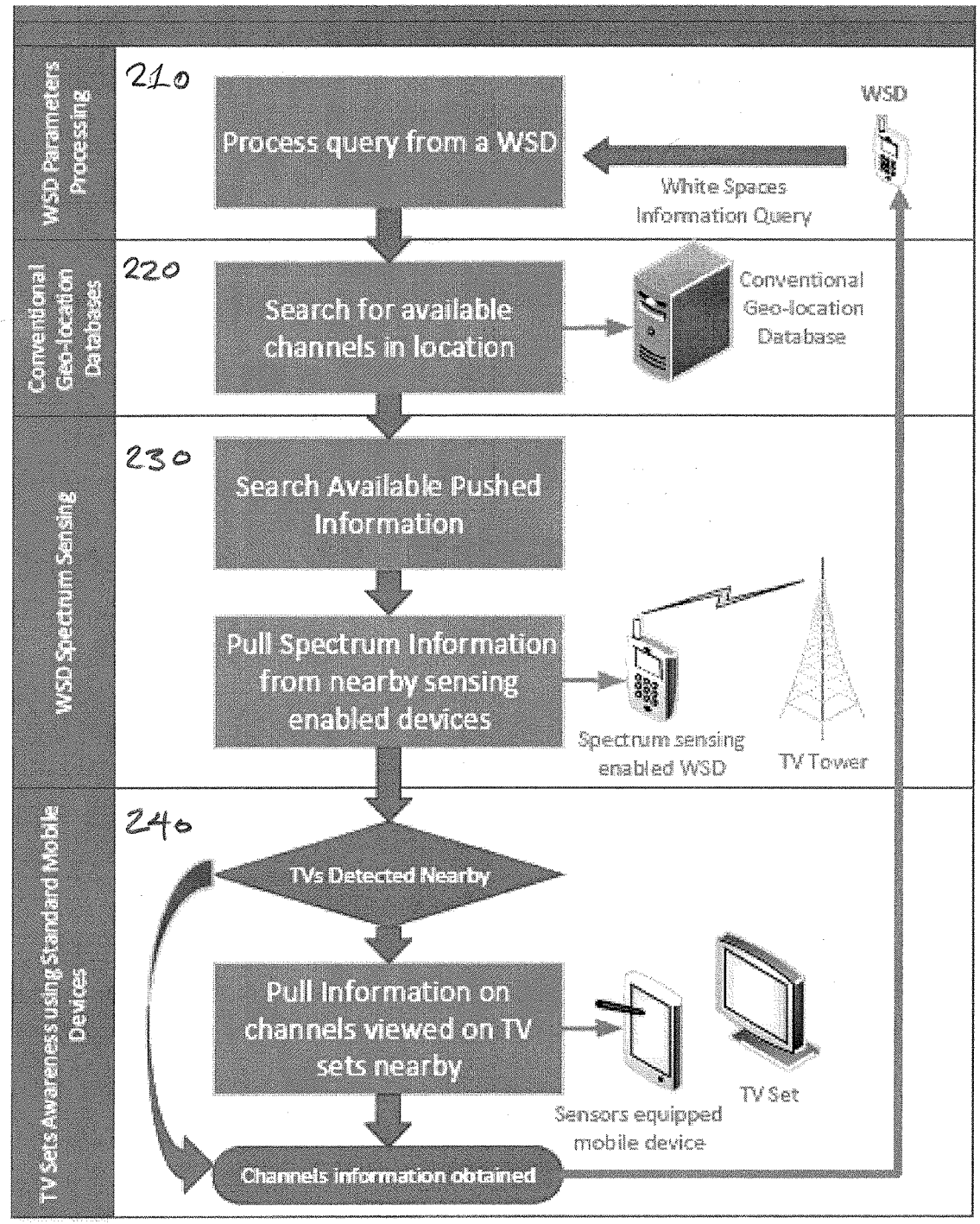
FIG. 3 illustrates the system's operation flow.

The multi-layered operation flow, shown in FIG. 3, is divided based on the different types of available white space opportunities. These opportunities vary in terms of persistence and reliability. For each White Spaces Information Query 210, the system aims to obtain the most persistent and reliable availability information.

The first layer 220 consults conventional geo-location databases to identify white space opportunities based only on the parameters of licensed TV transmitters. This layer presents white space information with the highest confidence and persistence.

The second layer 230 checks contributed spectrum sensing readings which lie within the white space network's coverage area given its transmission power. If there is no contributed spectrum information found, the system will pull real-time spectrum information on demand. This layer can increase the number of available white spaces or help the network enhance its transmission parameters based on the sensed interference on each channel. The white space information obtained from this layer is highly persistent as the view of the spectrum is not likely to change fast. However, this sensory information needs to be confirmed by more than one contributing device to establish its credibility.

The third layer 240 detects the presence and the state of TV sets within the white spaces network's coverage area to seek more white space opportunities (i.e. a TV transmitter is operational with no TV sets tuned to its channel). This type of white space information is highly volatile because TV viewers switch channels randomly. Moreover, to increase the confidence in such information more than one contributor needs to support the same sensor based decision.

It is envisioned that as TV sets become more "aware" and are equipped with the capability to connect to the internet, that individual TV sets will be able to report their status directly to the cloud, thereby providing more reliable information on which cells may be free.

Note that, in the event that conventional geo-location databases are unable to be modified to contain spectrum sensing data from WSDs and ambient sensing data from standard cell phones and embedded sensors, this secondary information may be kept in one or more separate databases.

Of note is that the information collected over time from multiple devices can determine the set of channels typically viewed at a particular TV receiver, ultimately increasing the persistence of the spectrum availability data but reducing the granularity of channel availability. In addition, the TV viewer's watching profile can be computed and stored in the cloud, which can then be used in the spectrum availability estimation.

White space opportunities, obtained from each layer, are associated with a validity period to improve the system's reliability. The WSD is required to re-check with the database for the white space's availability after the validity period expires. This period depends on both the persistence level and confidence associated with each reading. These levels are calculated based on the number of contributors conforming on the same reading as well as the source of the sensed information. Upon the reception of the system's response to its query, the WSD can determine the channels to transmit on, based on its required quality of service and the validly period of each available white space.

WSD Spectrum Sensing.

In one example of a novel contribution model for the new database, signal readings are collected from contributing spectrum sensing enabled WSDs. This architecture supports obtaining either a partial or full view of the TV bands spectrum from contributing devices along with their accurate location information. Spectrum sensing enabled devices as specified by the FCC are either sensing only devices, that depend solely on spectrum sensing to detect available channels, or, as the FCC encourages, mixed devices that use spectrum sensing with geo-location databases. Another source of spectrum information includes dedicated sensing infrastructures that could be deployed to enhance spectrum utilization in spectrum starved areas. Several cooperative spectrum sensing algorithms can be used to make the best use of collected spectrum sensory information.

FCC regulations for sensing only devices require initial sensing of 30 seconds to select the channel to be used. After that, these devices are required to ensure that the channel is vacant every 60 seconds. While these regulations ensure protection of TV spectrum incumbents, they require a mobile device to regularly check to ensure the consistency of the spectrum view.

In contrast, the described system's interest lies in determining the spectrum view for each statically determined cell and the cell's area is smaller than the approved sensing only device coverage area. Therefore, the spectrum sensing requirements for this system are more relaxed.

TV Set Awareness Using Standard Mobile Devices.

In another example, sensory information collected by standard mobile devices (cell phones, laptops, tablets, etc) can be used as unconventional spectrum sensors to deduce whether a TV set is available within an environment or not. If a TV set is detected, regular checks are performed to detect the channel to which the TV is currently tuned. Sensors like cameras, microphones, accelerometers, etc. can be used to detect both TV set behavior (e.g. visual and acoustic fingerprints) and TV viewer behavior (e.g. sitting, using the remote and texting about TV shows). This information could be used to identify the presence of TV sets and whether they are ON or OFF. Moreover, using online streaming sites and channel guides, the channel currently playing could be detected using only the acoustic fingerprint of the TV set.

Smart infrastructures (e.g. smart homes) can also be used for inferring information as they are equipped with sensors designated for different functionalities required to improve the quality of people's life. These functionalities include TV controls which can be directly used to update the system. Another form of sensors are the new generation of Internet-enabled smart TV sets that can be used to update the system's database in real-time with information on the channels being viewed. These sources of information could reliably tell whether there is a TV that is ON in a certain area of interest and the channel to which that TV is tuned.

By accumulating and aggregating detected channel information for each TV set, collected from different sources with different confidence levels, and correlating them with time, high confidence TV set detection decisions can be reached. The system then becomes capable of constructing or estimating a watching profile for a viewer to predict when a particular TV may be in use and to which channel the TV may be tuned. This stochastic behavior can further be leveraged to enhance the system's decisions and confidence estimation.

Results and Discussion

Simulations were conducted for Miami City, Fla. and New York County in New York, to illustrate the potential gain of spectrum availability in white spaces in urban areas. According to the United States Census Bureau, New York County, N.Y. has 732,204 households within an area of 22:83 mi$^2$ and Miami City has 149,077 households within an area of 35 mi$^2$. In this simulation, these households were distributed uniformly over the two areas, assigning one TV set for each household. 21% of the TV sets were randomly picked as operational to account for the statistics showing that the average American watches TV about 5.2 hours a day. Then, 10% of the TV sets were selected to be tuned to a broadcast channel. One of the broadcast TV channels in the designated area was assigned to each of the TV sets (27 channels in New York County and 26 channels in Miami City).

WSDs were distributed over the two areas to measure the potential increase in the number of available channels. Then, the amount of free white spaces on which each WSD can operate without violating the FCC's protection criteria for the TV sets was measured. The protection criteria for co-channel transmission was selected to be 23 db SNR and −33 db SNR for adjacent channel transmissions. The Okumura-Hata model for urban areas was applied to identify the separation needed between the WSD and the TV set to maintain the minimum field strength of 41 dbu for TV service at the TV set, which is specified by the FCC. The simulation was made for the following transmission powers:

- 1 mW used in experiments conducted for local area white space networks in.
- 5 and 10 mW account for possible transmission powers that could be used to increase white spaces availability and range.
- 40 mW which is the maximum transmission power specified by the FCC for WSDs working in within a TV stations protected service area broadcasting on adjacent channel.
- 100 mW which is the maximum allowed transmission power by the FCC for portable WSDs.

The awareness of the geo-location database of these different transmission powers presents another enhancement that enables the detection of white spaces relative to the WSD's transmission power. This results in avoiding the assumption of current geo-location databases that the WSDs can work only on two levels of power (i.e. 40 mW and 100 mW). Table 2 summarizes the parameters for each of the different transmission obtained using the Okumura-Hata model for urban areas.

TABLE 2

Parameters used in the simulations for TV band devices with transmission powers 1, 5, 10, 40, and 100 mW in terms of the maximum coverage distance, the minimum distance between the TV band device, and the TV set to avoid interference.

| Power | Coverage | Min. separation distance for adjacent channel transmission | Min. separation distance for co-channel transmission |
|---|---|---|---|
| 1 mW | 59 m | 9 m | 182 m |
| 5 mW | 86 m | 13.2 m | 265 m |
| 10 mW | 101 m | 15.5 m | 310 m |
| 40 mW | 140 m | 22.4 m | 430 m |
| 100 mW | 173 m | 26.4 m | 533 m |

The results of the simulation are summarized in Table 3. There is a significant difference between the two cities due to the difference in population densities. Comparing the spectrum availability of the new system to conventional geo-location databases (Table 1) for Miami City, devices working with any transmission power obtain at least 12.2 extra channels instead of no channels in case of 100 mW for conventional geo-location databases. Similarly, in New York County, despite the high density of TV sets, almost 20% of devices working with 100 mW transmission power obtain 1.27 channels on average to work on instead of not being able to work at all when using the conventional geo-location databases.

TABLE 3

Simulation of potential gain in white spaces for WSDs working in Miami City, Florida and New York County, New York with transmission powers of 1, 5, 10, 40, and 100 mW given information on TV sets locations and the channels they are currently tuned to.

| Power | Percent of WSDs gaining more channels in New York County | Average number of channels gained in New York County | Percent of WSDs gaining more channels in Miami | Average number of channels gained in Miami |
|---|---|---|---|---|
| 1 mW | 100% | 9.65 | 100% | 23.4 |
| 5 mW | 99% | 4 | 100% | 21 |
| 10 mW | 92% | 2.7 | 100% | 19.6 |
| 40 mW | 49.8% | 1.53 | 100% | 15.5 |
| 100 mW | 19.9% | 1.27 | 100% | 12.2 |

As the transmission power is lowered to increase the bandwidth available for enterprise local area networks, the number of available channels increases, reaching 23.4 in Miami and 9.65 in New York County for all devices working with 1 mW (i.e. having a coverage of 59 m). This highlights the significant gains that can be achieved through a city scale deployment of the invention described herein.

In conclusion, this invention can detect available white space opportunities through a multi-layered architecture. This architecture uses unconventional spectrum sensing, supported by conventional spectrum sensing and geo-location databases to detect spectrum opportunities that are diverse in reliability and persistence. This system exploits the cloud's communication, computational and storage capabilities to infer available white spaces. This approach was shown to provide significant enhancement to current conventional approaches (i.e. geo-location databases) in city wide deployments.

The present invention has been described in accordance with several examples, which are intended to be illustrative in all aspects rather than restrictive. Thus, the present invention is capable of many variations in detailed implementation, which may be derived from the description contained herein by a person of ordinary skill in the art. The scope of the invention is captured in the claims below.

We claim:

1. A method, implemented as software running on a computer, for determining free white space opportunities in a broadcast spectrum comprising the steps of:
  a. consulting a geo-location database containing information regarding TV transmitters;
  b. defining and identifying a potential cell for use as free white space cell based on data in said geo-location database;
  c. collecting spectrum sensing data from one or more white space devices located within said identified potential cell;
  d. collecting ambient sensing data from within said identified potential cell, said ambient sensing data including visual and acoustic fingerprints of a TV receiver, and comparing said visual and acoustic fingerprints to known fingerprints of broadcast TV programs to determine the channel to which said TV receiver is tuned; and
  e. declaring said identified potential cell to be a free white space cell for a particular channel when it is determined with a pre-determined confidence level that TV receivers within said identified potential cell are not receiving a broadcast TV signal for said channel.

2. The method of claim 1 wherein said step (a) further comprises obtaining static information about TV transmitters including location, transmission power, antenna height and channels being transmitted.

3. The method of claim 1 wherein said spectrum sensing data consists of information contributed by enabled white space devices regarding sensed interference on each channel.

4. The method of claim 3 wherein said information contributed by white space devices is pushed by said white space device to said computer.

5. The method of claim 3 wherein said information contributed by white space devices is pulled from said white space device by said computer.

6. The method of claim 1 wherein said step of collecting ambient sensing data includes collecting data from sensors on smartphones located within said identified potential white space cell.

7. The method of claim 5 wherein said step of collecting ambient sensing data includes collecting data from embedded sensors located within said identified potential white space cell.

8. The method of claim 1 wherein said ambient sensing data includes data collected from cameras, microphones and accelerometers.

9. The method of claim 8 wherein said ambient sensing data is used to detect TV viewer behavior, including determining whether said viewer is sitting, using the remote or texting about TV shows.

10. The method of claim 1 further comprising the step of constructing a watching profile for a viewer based upon the collected ambient sensing data.

11. The method of claim 10 wherein said watching profile can be used to predict when a particular TV receiver may be On or Off and to which channel said TV receiver may be tuned.

12. A system for determining free white space opportunities in a broadcast spectrum comprising:
   a computer, said computer having access to the internet and running software performing the functions of:
   a. extracting data from a geo-location database containing information regarding TV transmitters;
   b. defining and identifying a potential cell for use as free white space cell based on data in said geo-location database;
   c. collecting spectrum sensing data from one or more white space devices located within said identified potential cell;
   d. collecting ambient sensing data from within said identified potential cell, said ambient sensing data including visual and acoustic fingerprints of a TV receiver, and comparing said visual and acoustic fingerprints to known fingerprints of broadcast TV programs to determine the channel to which said TV receiver is tuned; and
   e. declaring said identified potential cell to be a free white space cell for a particular channel when it is determined with a pre-determined confidence level that TV receivers within said identified potential cell are not receiving a broadcast TV signal for said channel.

13. The system of claim 12 wherein said spectrum sensing data consists of information contributed by enabled white space devices within said identified potential white space cell regarding sensed interference on each channel.

14. The system of claim 13 wherein said ambient sensing data includes data from embedded sensors located within said identified potential white space cell comprising visual and acoustic fingerprints of a program being displayed by a nearby TV receiver.

15. The system of claim 14 wherein said visual and acoustic fingerprints can be compared to known visual and acoustic fingerprints of programs being broadcast by said TV transmitter to determine the channel to which said TV receiver is tuned.

16. The system of claim 13 wherein said ambient sensing data is collected from sensors of a smartphone located within said potential white space cell.

* * * * *